United States Patent [19]

Susnjara

[11] Patent Number: 4,764,077
[45] Date of Patent: Aug. 16, 1988

[54] ASSEMBLY FOR PERFORMING WORK FUNCTIONS ON A WORKPIECE

[75] Inventor: Kenneth J. Susnjara, Santa Claus, Ind.

[73] Assignee: Thermwood Corporation, Dale, Ind.

[21] Appl. No.: 853,668

[22] Filed: Apr. 18, 1986

[51] Int. Cl.$^4$ ............ B05B 13/04; B05C 13/00; B25J 11/00
[52] U.S. Cl. ............ 414/222; 118/319; 118/320; 414/744 R; 901/7; 901/43
[58] Field of Search ............ 901/6, 7, 8, 43, 42, 901/41; 414/222, 223, 744 R, 224–226; 269/59, 71; 108/20, 42, 94, 103; 198/346.1, 346.2, 378; 118/319, 320, 321

[56] References Cited

U.S. PATENT DOCUMENTS

| 2,672,121 | 3/1954 | Peeps | 118/323 X |
|---|---|---|---|
| 3,084,810 | 4/1963 | Vogel | 414/744 R |
| 3,222,716 | 12/1965 | Harris | 414/744 A X |
| 3,225,941 | 12/1965 | Slattery | 414/744 A X |
| 3,865,525 | 2/1975 | Dunn | 901/43 X |
| 3,968,885 | 7/1976 | Hassan et al. | 198/346.2 X |
| 4,270,649 | 6/1981 | Mayer | 414/744 B X |
| 4,527,936 | 7/1985 | Hartlieb | 414/744 A X |
| 4,541,062 | 9/1985 | Kada et al. | 901/6 X |
| 4,569,218 | 2/1986 | Baker et al. | 414/223 X |
| 4,576,537 | 3/1986 | Inaba et al. | 414/222 |
| 4,611,695 | 9/1986 | Kato et al. | 901/43 X |
| 4,616,593 | 10/1986 | Kawamura et al. | 118/323 X |
| 4,644,897 | 2/1987 | Fender | 901/43 X |
| 4,666,363 | 5/1987 | Johansson | 901/6 X |

FOREIGN PATENT DOCUMENTS

| 141640 | 5/1980 | German Democratic Rep. | 414/223 |
|---|---|---|---|
| 56-13262 | 2/1981 | Japan | 414/223 |
| 357945 | 12/1961 | Switzerland | 414/744 B |
| 819888 | 9/1959 | United Kingdom | 108/20 |
| 1033309 | 8/1983 | U.S.S.R. | 414/226 |

Primary Examiner—Robert J. Spar
Assistant Examiner—P. McCoy Smith
Attorney, Agent, or Firm—Lalos & Keegan

[57] ABSTRACT

An apparatus for performing a work function on a workpiece comprising a stationary support member, a workpiece support assembly mounted on the stationary support member for pivotal movement about a vertical axis, first and second workpiece holding members mounted on the workpiece support assembly, a mechanism for pivoting the workpiece support assembly between selected positions to move one of the workpiece holding members into position at a first station at which a work function may be performed on a workpiece while simultaneously moving the other workpiece holding member into position at a second station at which a workpiece may be loaded and unloaded, and a robot mounted on the stationary support member operable for performing a work function on a workpiece positioned at the work station.

18 Claims, 2 Drawing Sheets

ASSEMBLY FOR PERFORMING WORK FUNCTIONS ON A WORKPIECE

This invention relates to industrial robots and more particularly to a novel workpiece positioning assembly for use with an industrial robot.

Positioning and holding a workpiece so that an industrial robot can perform a work function on the workpiece generally has required that the robot stop its work function while the current workpiece is removed and a new workpiece is positioned on a positioning device. In an attempt to reduce the length of time in which the robot is not operating, various fixtures have been employed which provide a number of stations to allow a workpiece to be loaded and unloaded while the robot is performing a work function on another workpiece located at a work station. Such method, however, requires that the robot be programmed to perform the work function at two separate locations, normally requiring twice the effort in programming the robot. Another method employed to reduce the down time of the robot is theuse of a rotating table with a positioning apparatus located at either end of the rotating table. To operate such an assembly, one station is located so that the robot can perform the work function on the workpiece while the other station is located so that a second workpiece can be properly positioned on the apparatus. When the work function is completed, the table rotates 90° moving the completed workpiece to the position where it can be removed and replaced, and moving the second workpiece into position so that the robot can perform its work function. Such type of an arrangement, however, requires a substantial area to locate both the robot and the workpiece positioning table.

Accordingly, it is the principal object of the present invention to provide an improved assembly for performing a work function on a workpiece.

Another object of the present invention is to provide an improved assembly for performing a work function on a workpiece which minimizes the amount of down time of the means for performing the work function.

A further object of the present invention is to provide an improved assembly for performing a work function on a workpiece which utilizes a minimal amount of floor space.

A still further object of the present invention is to provide an improved assembly for performing a work function on a workpiece utilizing an industrial robot and an assembly for positioning a workpiece to perform a work function by the robot while simultaneously providing for unloading and loading another workpiece.

Another object of the present invention is to provide an improved assembly for positioning workpieces for performing work functions by a robot and loading and unloading workpieces.

A further object of the present invention is to provide an improved assembly for performing a work function on a workpiece which is simple in design, comparatively inexpensive to manufacture and highly effective in performance.

Other objects and advantages of the present invention will become more apparent to those persons having ordinary skill in the art to which the present invention pertains from the following description taken in conjunction with the accompanying drawings, wherein.

Figure 1:
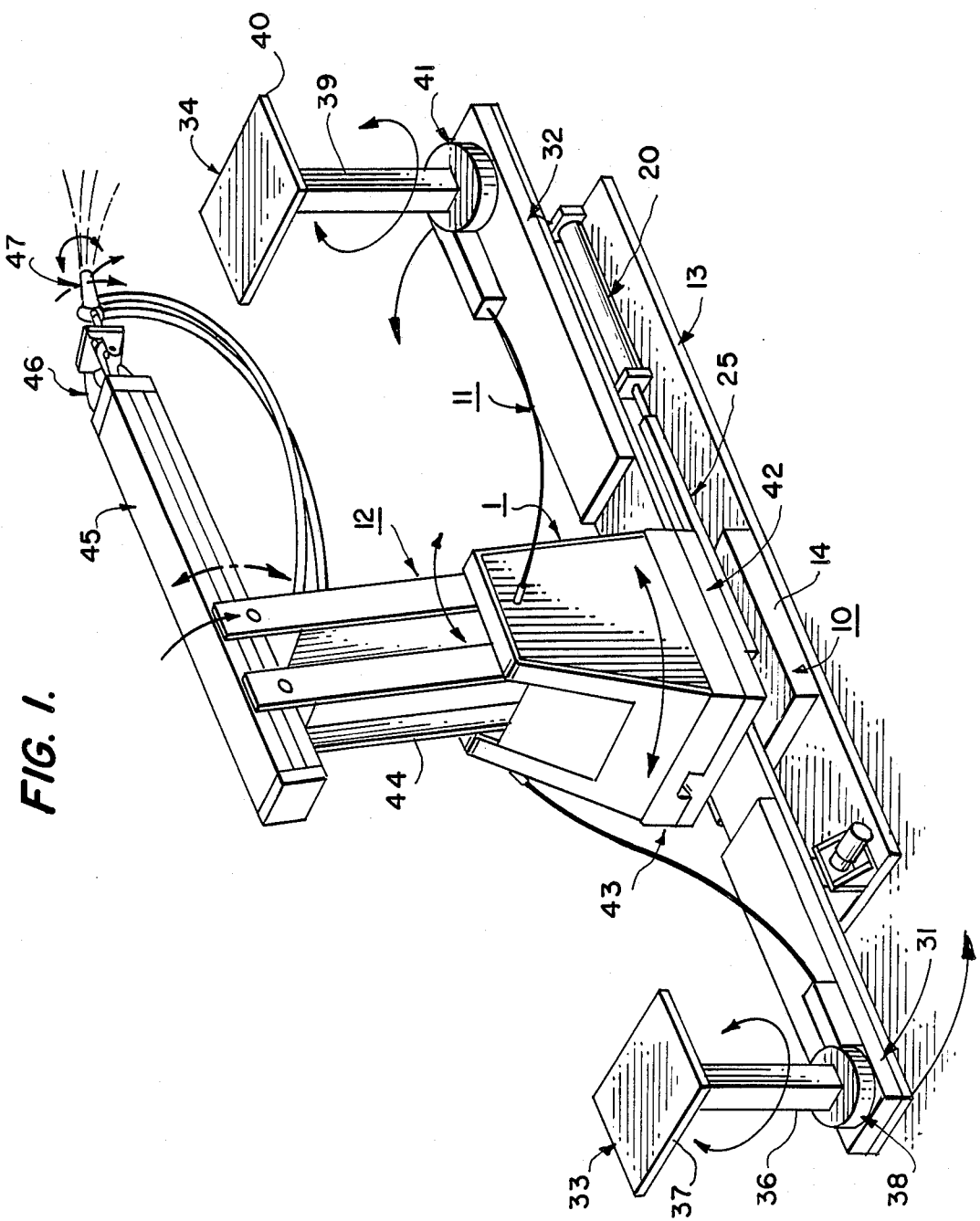
FIG. 1 is a perspective view of an embodiment of the invention.

Referring to FIG. 1 of the drawings, there is illustrated an embodiment of the invention generally including a stationary support assembly 10, a workpiece support assembly 11 mounted on the stationary support assembly for pivotal movement about a vertical axis, and a robot 12 also mounted on the stationary support assembly for pivotal movement about the same vertical axis.

Figure 2:
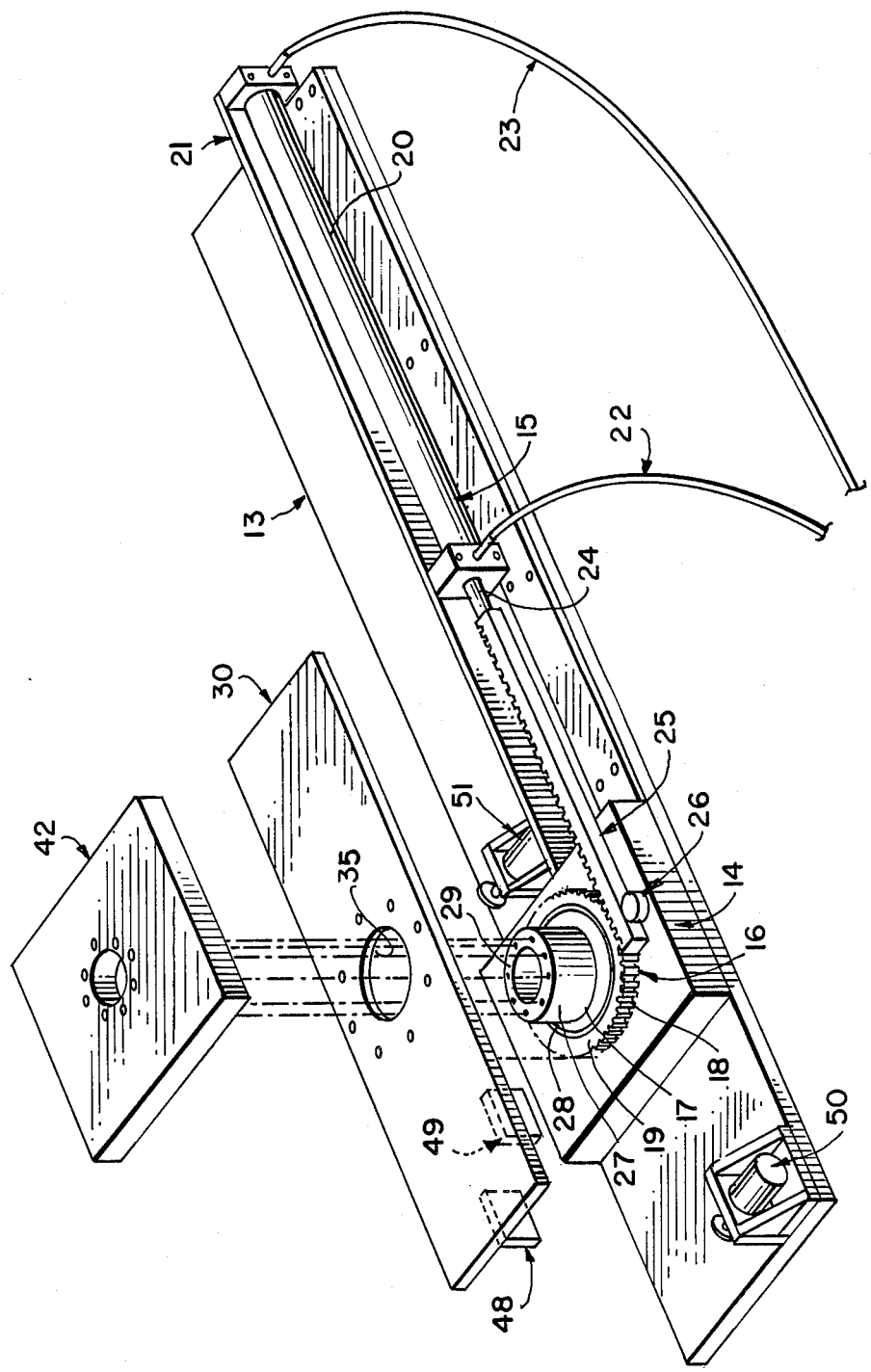
FIG. 2 is a perspective view of the drive mechanism of the embodiment shown in FIG. 1, illustrating some of the componets in exploded relation.

As best seen in FIG. 2, the stationary support assembly includes a support plate member 13 adapted to be securely attached to the floor, a mounting plate 14 rigidly secured to support plate 13 and a drive mechanism 15. Mounted on mounting plate 14 is a bearing 16 having a inner race 17 rigidly secured to mounting plate 14 and an outer race 18 provided with gear teeth 19. Drive mechanism 15 consists of a hydraulic cylinder 20 disposed in a housing 21 and rigidly secured to mounting plate 14, provided with fluid supply lines 22 and 23, and a rod 24. Mounted on the end of rod 24 is a gear rack 25 which meshes with gear teeth 19 formed on the outer race of bearing 16. The teeth of rack 25 are maintained in mesh with gear teeth 29 by means of a guide roller 26 mounted on mounting plate 14 and engaging a backside of rack 25.

The inner race of bearing 16 is formed with a raised boss 27 providing a lower, annular surface 28 and a upper, annular mounting surface 29.

Workpiece support assembly 11 includes a support plate 30, a pair of mounting plates 31 and 32 and a pair of fixtures 33 and 34. As best shown in FIG. 2, support plate 30 is provided with a circular opening 35 which receives raised boss 28 of the inner race of bearing 16 therethrough, and permits support plate 30 to be seated on and bolted to outer race 18 of the bearing.

Mounting plates 31 and 32 are mounted on and rigidly secured to the outer ends of support plate 30. Mounted on mounting plate 31 for rotational movement about a vertical axis is a post member 36 having a platform 37 for supporting a workpiece thereon. Rotation of fixture 33 is provided by a drive mechanism 38 mounted on mounting plate 31 and operatively connected to post member 36. Similarly, fixture 34 includes a post mmember 39 mounted for rotational movement on mounting plate 32, a platform 40 mounted on the post member for supporting a workpiece, and a drive mechanism 41 mounted on mounting plate 32 and operatively connected to post member 39.

Workpiece fixtures 33 and 34 are angularly displaced relative to each other about the vertical axis of bearing 16 so that while fixture 34 is positioned at a work station for having a work function performed on the workpiece mounted on the fixture, fixture 33 simultaneously will be positioned at another station so that workpieces may be loaded and unloaded with respect to such fixture. Although fixtures 33 and 34 are shown in the drawings as being angularly displaced 180° it is contemplated that such angular displacement may be less that 180°, such as 90° and 120°, depending upon the amount of working space provided.

Robot 12 includes a stationary support member 42, a base member 43, a lower arm assembly 44, an upper arm assembly 45 and a wrist assembly 46. Support member 42 is adapted to overlie support plate 30 and be seated on mounting surface 29 and rigidly secured to the inner race of bearing 16. Base member 43 is mounted on stationary support member 42 for pivotal movement about the vertical axis of bearing 16. Arm assembly 44 is mounted on base member 43 for pivotal movement about a first set of horizontal axes. Upper arm assembly 45 is mounted on the upper ends of lower arm assembly 44 for pivotal movement relative thereto about a second set of horizontal axes. Wrist assembly 46 is mounted on the free end of upper arm assembly 45 for universal movement. It includes means for supporting a working tool 47 such as a spraying gun. The robot further is provided with a source of hydraulic fluid for actuating the various components thereof and a programmable control unit for causing the robot to cycle through selected motions to perform desired work functions.

In the operation of the assembly as described, assuming the work function to be performed is a spraying operation, a spray gun is mounted on wrist assembly 46, a workpiece to be sprayed is mounted on fixture 34 and the control unit of the robot is programmed to cycle the robot through a series of predetermined motions to position the spray gun relative to the workpiece positioned on fixture 34, the assembly is actuated to begin the operation. As the operation proceeds, the robot will proceed to cycle through its programmed sequence of motions to spray the workpiece mounted on fixture 34 which is positioned at the selected work station. While the workpiece at the work station is being sprayed, the operator would load a second workpiece on fixture 33. When the spraying cycle of the robot has been completed, assembly 11 will pivot 180° to position fixture 34 at the unloading station while positioning fixture 33 with the workpiece to be sprayed, at the work station. With the unsprayed workpiece thus positioned at the work station, the robot again is actuated to proceed through its programmed sequence of motions to spray the new workpiece at the unloading station and load another workpiece on the fixture. Thereafter, such procedure is repeated so that the only function of the operator is to unload sprayed workpieces from the fixture located at the loading and unloading station and loading the workpiece to be sprayed on the fixture.

The control unit of the assembly would be programmed to synchronize the operation of the robot with the operation of the workpiece support assembly so that the cycling of the robot and the workpiece support assembly is coordinated. In addition, if it is desired to rotate fixtures 33 and 34 about their respective axes, such rotational movement also would be synchronized with the operations of the robot and the workpiece support assembly. As best shown in FIG. 2, support plate 30 of the workpiece support assembly is provided with a set of depending blocks 48 and 49 which are engageable with a set of cushioned stops 50 and 51, respectively, mounted on support plate 13 for assuring the positioning of fixtures 33 and 34 at the work and loading and unloading stations.

It will be appreciated that the upon extension and retraction of rod 24 of the drive mechanism, outer race 18 of bearing 16 will rotate to provide the pivotal movement of the workpiece support assembly. By virtue of support member 42 being secured to the stationary inner race of bearing 16 and the base member of the robot being rotatable relative to support member 42, the robot and the workpiece support assembly are able to rotate independently of each other thus permitting totally independent movement of the robot relative to either of the stationary or workpiece support assemblies.

From the foregoing detailed description, it will be evident that there are a number of changes, adaptations and modifications of the present invention which come within the province of those persons having ordinary skill in the art to which the aforementioned invention pertains. However, it is intended that all such variations not departing from the spirit of the invention be considered as within the scope thereof as limited solely by the appended claims.

I claim:

1. An assembly for performing a work function on a workpiece comprising a longitudinally disposed, stationary support means, workpiece support means mounted on and in close proximity to said stationary support means for pivotal movement about a vertical axis, at least one workpiece holding means mounted on said workpiece support means, means for pivoting said workpiece support means about said vertical axis to position said workpiece holding means at a first station at which a work function may be performed on a workpiece disposed thereon and at a second station at which a workpiece may be loaded thereon and unloaded therefrom, said means for pivoting said workpiece support means comprising a pinion mounted on said workpiece support means coaxially relative to said vertical axis and a rack mounted on said stationary support means longitudinally reciprocable and operatively engageable with said pinion, and a robot mounted on said stationary work support means for performing a work function on a workpiece position at said work station, said robot including a base member rotatable relative to said stationary support means about said vertical axis.

2. An assembly according to claim 1 wherein said workpiece holding means includes means for pivoting a workpiece mounted thereon about an axis relative to said workpiece support means.

3. An assembly according to claim 2 wherein the operations of said robot, said workpiece support means and said workpiece holding means are coordinated.

4. An assembly according to claim 1 wherein said robot may be programmed to move a tool through a predetermined cycle to perform a work function on a workpiece mounted on a workpiece holding means and positioned at said first station, and the operations of said robot and said means for pivoting said workpiece support means are synchronized so that said robot will perform its work cycle when a workpiece holding means is positioned at said first station and said means for pivoting said workpiece support means will commence its pivot action when said robot work cycle is completed.

5. An assembly according to claim 1 wherein said robot includes a lower arm assembly mounted on said base member for pivotal movement about a first horizontal axis, an upper arm assembly mounted on said lower arm assembly for pivotal movement about a second horizontal axis and a wrist assembly mounted on said upper arm assembly for universal movement relative to said upper arm assembly, said wrist assembly having means for mounting a working tool.

6. An assembly for performing a work function on a workpiece comprising a longitudinally disposed, stationary support means, workpiece support means mounted on and in close proximity to said stationary support means for pivotal movement about a vertical axis, first and second workpiece holding means mounted on said workpiece support means, means for pivoting said workpiece support means about said vertical axis between selected positions to move one of said workpiece holding means into position at a first station at which a work function may be performed on a workpiece mounted thereon while simultaneously moving the other of said workpiece holding means into position at a second station at which a workpiece may be loaded thereon and unloaded therefrom, said means for pivoting said workpiece support means comprising a pinion mounted on said workpiece support means coaxially relative to said vertical axis and a rack mounted on said stationary support means longitudinally reciprocable and operatively engageable with said pinion, and a robot mounted on said stationary support means operable for performing a work function on a workpiece positioned at said first work station, said robot including a base member rotatable relative to said stationary support means about said vertical axis.

7. An assembly according to claim 6 wherein said workpiece holding means are disposed 180 degrees apart relative to said axis.

8. An assembly according to claim 6 wherein each of said workpiece holding means includes means for pivoting a workpiece mounted thereon about an axis relative to siad workpiece support means.

9. An assembly according to claim 8 wherein the operations of said robot, said workpiece support means and said workpiece holding means are coordinated.

10. An assembly according to claim 6 wherein said robot maybe programmed to move a tool through a predetermined cycle to perform a work function on a workpiece mounted on a workpiece holding means and positioned at said first station, and the operations of said robot and said means for pivoting said workpiece support means are synchronized so that said robot will perform its work cycle when a workpiece holding means is positioned at said first station and said means for pivoting said workpiece support means will commence its pivot action when said robot work cycle is completed.

11. An assembly according to claim 6 wherein said robot includes a lower arm assembly mounted on said base member for pivotal movement about a first horizontal axis, an upper arm assembly mounted on said lower arm assembly for pivotal movement about a second horizontal axis and a wrist assembly mounted on said upper arm assembly for universal movement relative to said upper arm assembly, said wrist assembly having means for mounting a working tool thereon.

12. An assembly for performing a work function on a workpiece comprising a stationary support means, workpiece support means mounted on said stationary support means for pivotal movement about a first axis, at least one workpiece holding means mounted on said workpiece support means, means for pivoting said workpiece support means about said first axis to position said workpiece holding means at a first station at which a work function may be performed on a workpiece disposed thereon and at a second station at which a workpiece may be loaded thereon and unloaded therefrom, and a robot mounted on said stationary support means for performing a work function on a workpiece positioned at said work station, said robot including a base member rotatable relative to said stationary support means about said first axis.

13. An assembly according to claim 12 wherein said first axis is disposed vertically.

14. An assembly according to claim 12 wherein the operations of said robot and said workpiece support means are coordinated.

15. An assembly for performing a work function on a workpiece comprising a stationary support means, workpiece support means mounted on said stationary support means for pivotal movement about a first axis, first and second workpiece holding means mounted on said workpiece support means, means for pivoting said workpiece support means about said first axis between selected positions to move one of said workpiece holding means into position at a first station at which a work function may be performed on a workpiece mounted thereon while simultaneously moving the other of said workpiece holding means into position at a second station at which a workpiece may be loaded thereon and unloaded therefrom, and a robot mounted on said stationary support means operable for performing a work function on a workpiece positioned at said first work station, said robot including a base member rotatable relative to said stationary support means about said first axis.

16. An assembly according to claim 15 wherein said axis is disposed vertically.

17. An assembly according to claim 15 wherein said workpiece holding means are disposed 180 degrees apart relative to said axis.

18. An assembly according to claim 15 wherein the operations of said robot and said workpiece support means are coordinated.

* * * * *